United States Patent [19]

Carey, Jr.

[11] 4,011,067

[45] Mar. 8, 1977

[54] FILTER MEDIUM LAYERED BETWEEN SUPPORTING LAYERS

[75] Inventor: Patrick H. Carey, Jr., Bloomington, Minn.

[73] Assignee: Minnesota Mining and Manufacturing Company, St. Paul, Minn.

[22] Filed: Sept. 11, 1975

[21] Appl. No.: 612,460

Related U.S. Application Data

[63] Continuation of Ser. No. 437,880, Jan. 30, 1974, abandoned.

[52] U.S. Cl. .................................. 55/354; 55/487; 55/528; 55/DIG. 35; 128/142.6
[51] Int. Cl.² .................................. B01D 46/18
[58] Field of Search ............................ 55/485–487, 55/524, 527, 528, 351–354, DIG. 35; 210/491, 508; 128/142.6; 264/257

[56] References Cited

UNITED STATES PATENTS

| 2,835,341 | 5/1958 | Parker, Jr. ............................ 55/487 |
|---|---|---|
| 3,102,014 | 8/1963 | Aitkenhead ............................ 55/352 |
| 3,251,475 | 5/1966 | Till et al. ............................ 55/527 |
| 3,258,900 | 7/1966 | Harms ............................ 55/487 |
| 3,316,904 | 5/1967 | Wall et al. ............................ 55/528 |
| 3,460,680 | 8/1969 | Domnick ............................ 55/485 |
| 3,606,740 | 9/1971 | Ballennie ............................ 55/527 |
| 3,745,748 | 7/1973 | Goldfield ............................ 55/354 |

OTHER PUBLICATIONS

Superfine Thermoplastic Fibers by Van Wente in Industrial & Engineering Chemistry, vol. 48, No. 8, dated Aug. 1956, pp. 1342–1346.

*Primary Examiner*—Bernard Nozick
*Attorney, Agent, or Firm*—Cruzan Alexander; Donald M. Sell; Roger R. Tamte

[57] ABSTRACT

A new filter medium, which can remove a high percentage of fine particles from a gas stream while causing a relatively low pressure drop in the gas stream, comprises a base porous web, one or more lightweight non-self-supporting layers of microfibers collected and carried on the base porous web, and a top porous web. A new aerosol filter apparatus incorporates the new filter medium to provide economical consistent filtering of air in a home, office, or industrial environment. In this new filter apparatus, a web of the filter medium extends from a supply roll across a stream of the air being cleaned to a take-up roll; and the filter medium is advanced from the supply roll to the take-up roll to gradually provide a fresh length of filter medium in the air stream.

21 Claims, 4 Drawing Figures

FILTER MEDIUM LAYERED BETWEEN SUPPORTING LAYERS

This is a continuation of application Ser. No. 437,880 filed Jan. 30, 1974, now abandoned.

A primary deficiency of the conventional mechanical air filters that are used to remove dust and other foreign particles from a home, office, or industrial atmosphere (for example, conventional furnace filters which take the form of rather thick panels formed of tightly convoluted webs of fine glass fibers) is that they operate at maximum effectiveness for only a short period of time. Within a few weeks after installation, they have usually collected a sufficient quantity of particles to greatly reduce the amount of air that may be moved through them by an air-blower means. And the less air that moves through the filter, the less the number of partiles removed from the air.

The present invention overcomes this deficiency in conventional filtering of room air, and makes possible many other advances in aerosol filtering with a unique new filter medium. Briefly, this new filter medium comprises a base porous preformed web; at least one thin lightweight layer of microfibers carried on the base web; and a top porous web disposed over the layer of microfibers. The microfibers used are quite fine, generally being less than about 0.5 micrometer in diameter and preferably being less than about 0.3 micrometer in diameter; and they are included in rather low amount. In fact, the layer of microfibers is so unusually thin and lightweight that the layer is generally not self-supporting. That is, while the layer of microfibers might be temporarily handleable by itself, it could generally not be practicably manufactured and wound by itself in a storage roll, unwound from the storage roll, and laminated to a base porous web. Generally the layer of microfibers is formed in situ on the base porous web by collecting microfibers from a mass of microfibers directed to the web.

The most suitable microfibers for use in a filter medium of the invention are solution-blown polymeric microfibers. Both melt-blown and solution-blown microfibers (formed by extruding a liquified (melted or dissolved) normally solid polymeic material through an orifice into a high-velocity gaseous stream that draws out and attenuates the extruded material into very fine fibers, which then solidify during travel in the gaseous stream to a collector) have long been recognized to have good potential in filter media. See Wente, Van A., "Superfine Thermoplastic Fibers", *Industrial Engineering Chemistry*, Volume 48, page 1342 et seq (1956) and such patents as Francis, U.S. Pat. Nos. 2,464,301 and 2,483,406 (which teach textile products made by mixing blown fibers and natural fibers); Ladisch, U.S. Pat. No. 2,612,679 (which teaches blown fibers and suggests use of mats of such fibers for filtration); Watson, U.S. Pat. No. 2,988,469 (which teaches webs of blown microfibers said to be useful as filters); Till et al, U.S. Pat. No. 3,073,735 (which teaches depositing a layer of preformed fibers followed by a layer of blown fibers to prepare mats that may be used as filters); and Mabru, U.S. Pat. No. 3,231,639 (which teaches the formation of melt-blown microfibers). Many of these patents are directed to filtration, and some of them, such as Till et al, discuss multilayer filter media in which a layer of blown microfibers is used in combination with layers of more coarse fibers.

But insofar as known, no one has previously taught a filter medium comprising a layer of microfibers and supporting webs such as are included in filter media of the present invention; and no one has previously attained the properties exhibited by filter media of the invention. One unique property exhibited by the new filter medium is its unusually low resistance to the flow of a gas stream. For a given particle penetration through the medium ("particle penetration" is the number of particles in a gas stream passed by the filter medium, measured as a percent of the number of particles entering the filter medium; "initial particle penetration" is the particle penetration during initial use of the filter medium), the filter medium causes an unusually low pressure drop in a gas stream bieng treated; and the result is that higher volumes of the gas can be moved through the filter medium with lower-powered blower means.

The new properties provided by filter media of the invention make a significant advance in the filtering art, and one illustration is the previously mentioned improvement in filtering of room air. More specifically, the new filter medium makes possible a new room air cleaner that achieves a steady level of good efficiency over a long operating life. Briefly, such a room air cleaner comprises: a) a blower means for drawing air in through an inlet, moving the air along an air path, and then exhausting the air through an outlet, b) a filter medium of the invention stored in a replaceable supply roll and extending across the air path to a take-up roll, and c) a drive means for advancing the filter medium at a predetermined rate from the supply roll to the take-up roll. Since the pressure drop through the new filter medium is small, a low-powered, quiet blower means can be used in the device. Further, since the pressure drop remains low for a rather long period of time, the filter medium may be advanced through the room air cleaner at a rather slow rate. For example, a twelve-inch wide web in a 130-cubic-feet-per-minute home unit may be advanced at a rate of two inches per day or less, meaning that the roll of filter medium is replaced at long intervals of 90 or 180 days. The filter medium is inexpensive, and the result is that economical high-efficiency filtering is made possible indefinitely. Such a capability in room air cleaning has never before been practicably achieved with mechanical filters.

DETAILED DESCRIPTION

Figure 1:
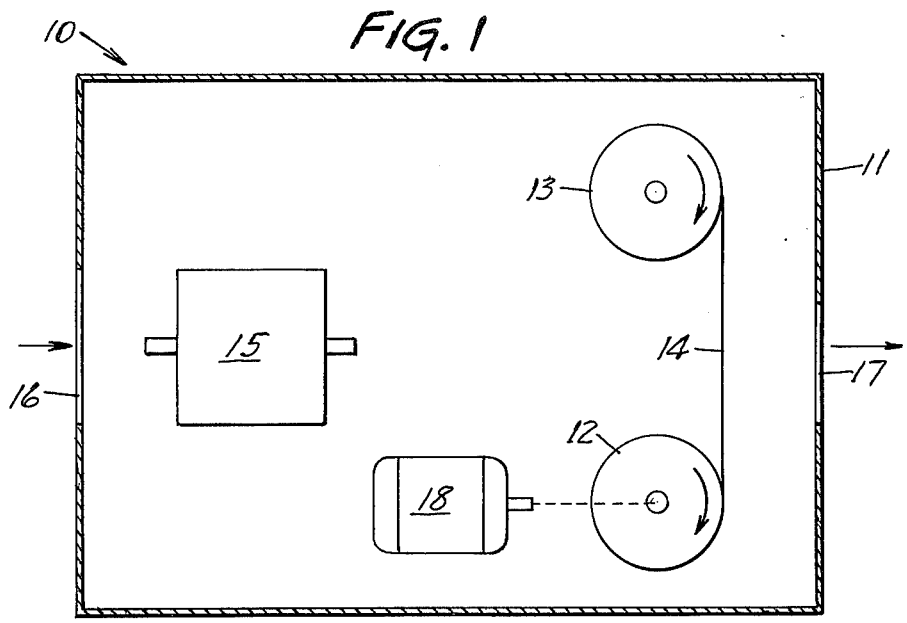
FIG. 1 is a schematic view of a room air cleaner of the invention.

The illustrative room air cleaner 10 shown in FIG. 1 comprises a housing 11 in which are mounted a take-up roll 12 and a supply roll 13 of a filter medium 14. A length of the filter medium extends from the supply roll 13 to the take-up roll 12, and passes through an air stream developed by a blower means 15. The blower means 15 draws air into the housing 11 through an inlet 16, forces the air through the length of filter medium between the supply and take-up rolls, and then through an outlet 17 in the housing. A drive motor 18 advances the filter medium from the supply roll to the take-up roll at a predetermined rate. The drive motor may operate continuously or may operate at periodic intervals.

Figure 2:
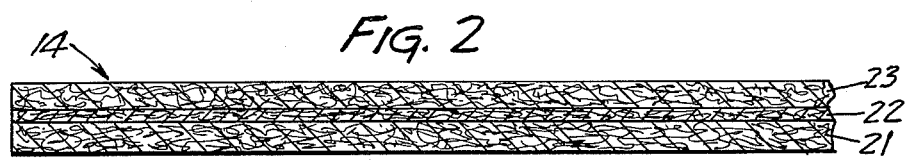
FIG. 2 is an enlarged section through a filter medium of the invention.

The filter medium 14, as illustrated in FIG. 2, comprises a base porous web 21, an intermediate layer 22 of microfibers, and a top porous web 23.

The base and top webs exhibit good porosity, so that together they contribute only a minor portion (normally less than 20 percent) of the pressure drop through a filter medium of the invention. The base and top porous webs may take a variety of forms, but typically they are nonwoven fibrous webs. In manufacturing such webs, staple fibers are typically deposited as a loose web on a carding or garneting machine, and then are compacted into a finished thin web. The web may be held in compacted form by a fusing of the fibers at their points of contact or by the use of a binder resin lightly impregnated into the web so as to preserve porosity of the web. The fibers in the webs generally comprise fibers of a synthetic polymer such as polyethylene terephthalate, but may also include natural fibers. The fibers are typically on the order of 1.5 to 3 denier.

The base porous web is a self-supporting web that for most uses has a weight on the order of 10 pounds per 320 square yards. But in some filter media of the invention in which the base web acts as a prefilter, the web may be thicker, having a weight on the order of 50 pounds per 320 square yards. The top porous web is usually similar to the base porous web, though it may be of lesser weight and greater porosity. In some filter media of the invention, the top porous web faces an air stream being filtered, and in that case it may also be designed to act as a prefilter.

The thickness of a layer of microfibers and the number of such layers used in a filter medium of the invention depends upon the particular use to be made of the filter medium. The filter medium can be designed differently depending on the different conditions of use (such as face velocity of a gas stream being filtered, power of blower means, particle penetration during a single pass of gas stream being cleaned, and pressure drop) that are desired. Filter media of the invention can be used as so-called absolute ("HEPA") filters and also as filters that pass a greater percentage of particles but operate at a lower face velocity.

For use in a room cleaner of the invention, the layer of layers of microfibers is generally rather thin, weighing less than 0.01, and preferably less than 0.005, pound per square yard. For other uses the layer or layers may be thicker, though even for an absolute filter the weight will generally be less than 0.06, and more often less than 0.03, pound per square yard.

As to pressure drop, in room air cleaners of the invention, which are typically designed to operate at a face velocity of 100 feet per minute, a filter medium exhibiting a pressure drop of 0.3 – 0.5 inch of water will normally be used. For absolute (HEPA) filters operating at a face velocity of 50 feet per minute, the filter medium will typically exhibit a pressure drop on the order of 3 to 4 inches of water. And for respiratory filters, the filter medium will generally exhibit a pressure drop of 0.3 to 0.5 inch of water at a face velocity of about 15 feet per minute.

Figure 4:
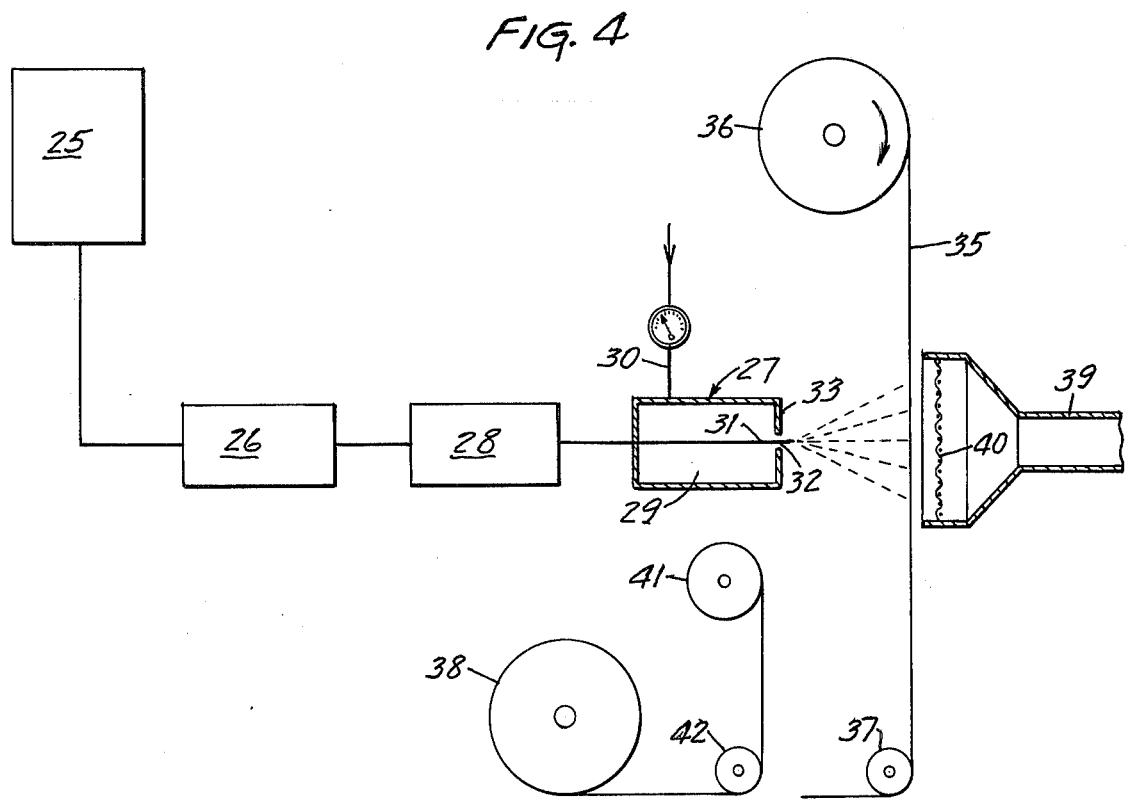
FIG. 4 is a schematic diagram of apparatus useful to prepare a filter medium of the present invention.

As previously noted, the preferred microfiber layer comprises solution-blown microfibers. A suitable apparatus for preparing such a microfiber layer is shown in FIG. 4. This apparatus includes a stand pipe 25 in which a solution of polymers is stored, and a pump 26, such as a Zenith pump, an extruding apparatus 27 to which the solution is pumped, and a filter 28 through which the solution passes to remove foreign particles or gels that might otherwise plug the extruding orifice. The extruding apparatus 27 comprises an air plenum 29 into which air is fed through an inlet 30. A narrow-diameter needle 31 inside the plenum is connected to the supply conduit of solution. The needle 31 extends through a small opening 32 in a face plate 33 of the plenum 29, with the end of the needle located a short distance beyond the face plate (such as 1.5 millimeters). Air supplied through the inlet 30 passes out through the opening 32, attenuates the extruded polymer, and carries the resulting microfibers to a base porous web 35. The air stream intersects the web 35 over a second air plenum 39, from which air is exhausted. A screen 40 covers the opening of the plenum to hold the web flat in the air stream. The web 35 is moved from a supply roll 36, around an idler roller 37, to a takeup roll 38. Top porous web material is unwound from a supply roll 41 and around an idler roller 42 where it is laminated over the layer of microfibers.

A wide variety of polymers may be used to prepare the solution-blown microfibers, including polymers based on vinyl chloride, styrene, vinyl butyral, and vinylidene chloride. These polymers may be dissolved in a variety of solvents including toluol, ethanol, tetrahydrofuran, methyl ethyl ketone or mixtures of such solvents to produce a desired viscosity. The polymers based on vinyl chloride are preferred, for one reason because of processing advantages. Also, filters of polyvinyl chloride fibers have been found to develop an electrostatic charge during use of the filter, and that charge is believed to improve the ability of the intermediate microfiber layer to attract and hold particulate matter. Such an electrostatic charge also develops on microfibers formed from other polymers.

One feature that is noted under microscopic examination of the layer of polution-blown microfibers in some preferred filter media of the invention is the presence of rounded particles of the polymer from which the microfibers are formed. It is believed that the rounded particles contribute to a spacing of the microfibers that may be partly responsible for the low pressure drop through the microfiber layer. Generally, these rounded particles, which apparently develop during the microfiber-blowing procedure, are on the order of 1 to 3 micrometers in diameter.

Figure 3:
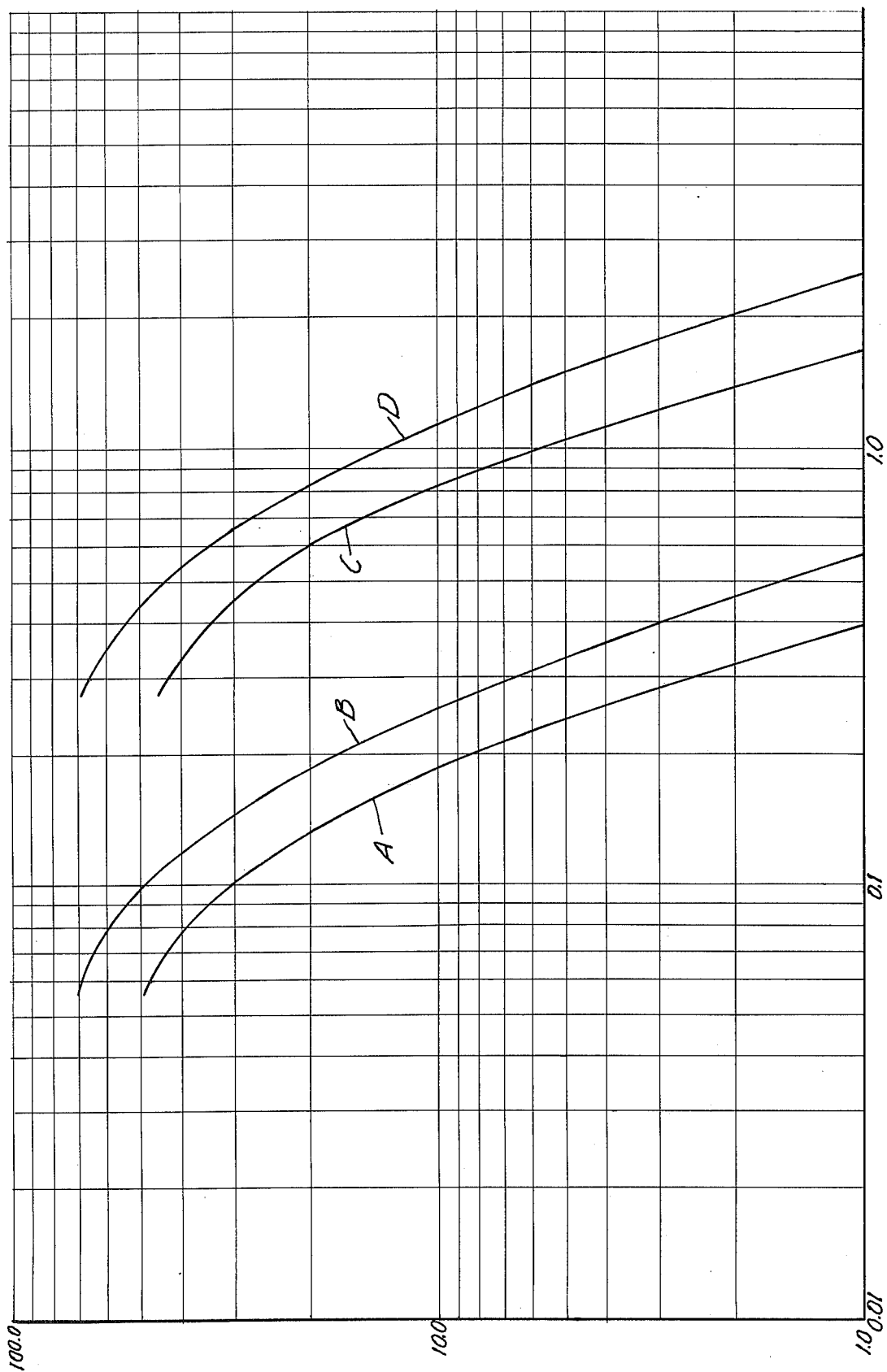
FIG. 3 shows plots of initial particles penetration versus pressure drop for filter media of the invention, particle penetration being in percent on the ordinate and pressure drop being in inches of water on the abscissa.

FIG. 3 shows different plots of initial particle penetration versus pressure drop for filter media of the invention, the ordinate showing particle penetration in percent, and the abscissa showing pressure drop in inches of water. Curves A and B define a range of relationships between particle penetration and pressure drop that useful filter media of the invention generally exhibit at a face velocity of 20 feet per minute; and curves C and D define a range of relationships that useful filter media of the invention generally exhibit at a face velocity of 100 feet per minute. As the curves indicate, filter media of the invention that have higher pressure drops (because of a greater thickness, for example) will have a lower particle penetration. Different filter media of the invention may differ in their particular relationship of initial particle penetration to pressure drop (depending, for example, on fiber size, fiber density, and other characteristics of the microfiber layer), but generally they will maintain a basic relationship within the range established by the two sets of curves in FIG. 3. Changing the thickness of a layer of microfibers, or the number of the layers, will also change the values of pressure drop and particle penetration exhibited by the filter media, but generally, not outside the basic relationship established by the two sets of curves in FIG. 3.

The curves shown in FIG. 3 provide a useful standard for controlling the process of manufacturing filter media of the invention. The nature of a layer of solution-blown microfibers may be varied by varying the solids content of the solution extruded through the microfiber-forming apparatus or the extruding conditions, for example. As a general rule, the lower the solids content, the lower the diameter of fibers that are formed. If the solids content is too low, no fiber structure is formed, while if the solids content is too high the microfibers are too coarse for desired filtering properties. The rate of flow of the solution may also be varied, generally under 10 or 15 cubic centimeters/minute, to control the dimensions of the filters and the number of fibers, and similarly the velocity of air around the needle may be varied. One way of determining the proper solids content for any polymer and solvent and the proper extruding conditions is to extrude a set of polymer solutions having different solids contents to form different microfiber layers on a base web, and plot the relationship of initial particle penetration versus static pressure for the different layers provided. (Because of the rather high porosity of the base web, the effect of the base porous web on the pressure drop may be disregarded.) The polymer solutions producing layers having a relationship between the curves shown in FIG. 3 are generally suitable solutions.

When more than one layer of microfibers is included in a filter medium of the invention, those layers will usually be substantially identical to one another; but they also may differ, as to the material from which the fibers are made, the diameter of the fibers, the numerical density of fibers, etc. Plural microfiber layers may lie directly against one another (as when microfiber layers are collected on two different base porous webs which are then laminated together with the microfiber layers face-to-face) or they may be separated by other layers, of base porous web, for example.

Filter media of the invention have other uses besides in a room air cleaner. For example, filter media of the invention may be used in respirators worn by a person, with the filter medium of the invention being disposed across the path of air intake into the respirator. Lightweight face masks of the general cup-shaped configuration shown in U.S. Pat. Nos. 3,333,585 or 3,521,630, may be used, for example.

The invention will be further illustrated by the following examples:

EXAMPLES 1 – 7

A variety of polymer solutions as shown in the following table were prepared and extruded onto a base porous web using apparatus as illustrated in FIG. 4, in which the extrusion needle was a No. 21 gauge, ½-inch-long needle. The base porous web was a carded, random-fiber web of 1.75-denier polyester fibers bonded together with alcohol-soluble nylon and having a weight of about 10 pounds per 320 square yards. A layer of microfibers weighing on the average about 0.004 pound per square yard was collected on the base web. A top porous web like the base web except that it weighed 5 pounds per 320 square yards was laminated over the layer of microfibers. The materials were then tested for initial particle penetration and static pressures at a face velocity of 100 feet per minute, and the results are reported in Table I. A range of static pressures and initial particle penetrations are reported for each different polymer, because different samples were prepared using different air pressures in the plenum.

A standard test apparatus was used in which a Royco Model 256 aerosol generator formed an air stream that contained potassium chloride particles about 0.1 to 1.0 micrometer in diameter. The particle-containing air stream was conducted through a drier and two flowmeters into an air plenum having a fixture into which a test sample can be inserted into the path of the air stream. The air input to the aerosol generator was 20 psi gauge, the atomizer pressure in the aerosol generator was 8 psi gauge, and the flow through the drier was 15–30 liters per minute. Particles were formed by the aerosol generator from a solution of potassium chloride in distilled water having a solids content of 0.5 weight-percent. Test probes extending into the air plenum on each side of the test fixture measure the number of particles in the air stream on each side of the test sample. The test probes were part of a forward-light-scattering linear photometer identified as T.P.A.-2C manufactured by Air Techniques Inc. Prior to inserting the test sample in the air plenum, the apparatus is adjusted so that the particle detection apparatus reads 100 percent. After insertion of the test sample, the downstream probe measures (by a particle count) the percentage of particles penetrating through the test sample. The static pressure at the test sample is measured with a water manometer.

EXAMPLE 8

A composite filter medium was prepared by sandwiching together four thicknesses of filter media like those of Example 5 except that the layer of microfibers in each of the thicknesses weighed 0.012 pound per square yard. This composite filter medium was compared with two commercial "HEPA" filters as to initial particle penetration and static pressure. The first commercial filter ("Dexter" Brand, Grade X1236) comprised resin-treated glass fibers about 0.2 – 2 micrometers in diameter, and the second commercial filter ("Microsorban" Brand) comprised polystyrene blown microfibers about 0.25 to 2 micrometers in diameter.

TABLE I

| Ex. No. | Polymer | Solvent | Process Conditions ||||  Filter Properties |||
|---|---|---|---|---|---|---|---|---|
| | | | Solids Content (wt.-pct.) | Rate of Solution Flow (cc/min) | Air Pressure in Air Collector Plenum (psi) | Pressure Speed (ft./min.) | Particle Drop (in. of water) | Initial Penetration [1] (percent) |
| 1 | polyvinyl butyral (Monsanto's "Butvar" B-90) | toluol and ethanol in 60/40 mixture by weight | 4 | 6.7 | 20 – 25 | 1 | 0.32–0.41 | 47 – 55 |
| 2 | polyvinyl chloride (Union Carbide QYTQ-7; i.v. of 1.0) | tetrahydrofuran and methyl ethyl ketone in a 70/30 mixture by weight | 6 | 4.5 | 12.5 – 17.5 | 1 | 0.38–0.55 | 31 – 46 |
| 3 | polyvinylidene chloride (Dow's F-310 ("Saran") | methyl ethyl ketone | 8 | 4.5 | 10 – 15 | 1.33 | 0.33–0.59 | 30 – 51 |
| 4 | chlorinated polyvinyl chloride (Goodrich's "Geon" 605×560) | tetrahydrofuran and methyl ethyl ketone in 70/30 mixture by weight | 8 | 4.5 | 10 – 15 | 1.33 | 0.32–0.45 | 32 – 51 |
| 5 | copolymer based on vinyl chloride[2] (Union Carbide's "Bakelite" VAGH) | methyl ethyl ketone | 14 | 3.0 | 10 – 14 | 1.5 | 0.34–0.45 | 38 – 55 |
| 6 | polyvinyl chloride (Union Carbide's QYAC-10; i.v. of 0.63) | tetrahydrofuran and methyl ethyl ketone in 70/30 mixture | 14 | 3.0 | 10 – 15 | 1.5 | 0.34–0.47 | 35 – 53 |
| 7 | polystyrene (Union Carbide's "Bakelite" SMD 3955) | toluene | 6 | 4.5 | 5 – 10 | 1.5 | 0.57–0.68 | 20 – 28 |

[1] measured at a face velocity of 100 feet per minute
[2] comprises 91% vinyl chloride, 3% vinyl acetate, and 6% hydroxyl calculated as vinyl alcohol The tests were performed by the procedures descibed in Military Standard 282, Test Method 102.1 using dioctylphthalate particles that averaged 0.3 micrometer and a face velocity of 10.4 – 10.5 feet per minute. The test measurements were made promptly so as to avoid any effect of dioctylphthalate on the polyvinyl chloride fibers. The results, as presented in Table II, show much lower particle penetration through filter media of the example at similar pressure drops.

TABLE II

| | Initial particle penetration (percent) | Static pressure (inches of water) | Mass of microfibers in filter medium (pound per sq.yd.) |
|---|---|---|---|
| First commercial filter medium | 0.015 | 2.0 | 0.153 |
| Second commercial filter medium | 0.007 | 2.1 | 0.337 |
| Filter medium of the invention | 0.003 | 2.1 | 0.048 |

What is claimed is:

1. A multilayer filter medium exhibiting a low pressure drop at a desired particle penetration comprising a preformed handleable self-supporting porous fibrous base layer; at least one thin lightweight non-self-supporting filtration layer of randomly arranged microfibers having an average diameter less than about 0.5 micrometer collected on said base layer by interposing the base layer in a stream of the microfibers, said layer of microfibers weighing less than about 0.01 pound per square yard; and a porous top layer laminated over the layer of microfibers so as to unify the filter medium into a single handleable self-supporting sheet material; said base and top layers contributing less than 20 percent of the pressure drop through the filter medium at a face velocity of 100 feet per minute; and said layer of microfibers having a relationship of initial particle penetration to pressure drop when tested at a face velocity of 100 feet per minute within the range defined by curves C and D shown in FIG. 3.

2. A filter medium of claim 1 in which the layer of microfibers weighs less than about 0.01 pound per square yard.

3. A filter medium of claim 1 which exhibits a pressure drop of less than about 0.5 inch of water at a face velocity of 100 feet per minute.

4. A filter medium of claim 1 that exhibits a pressure drop of about 3 to 4 inches of water at a face velocity of 50 feet per minute.

5. A filter medium of claim 1 that exhibits a pressure drop of about 0.3 to 0.5 inch of water at a face velocity of 15 feet per minute.

6. An aerosol filter apparatus comprising a) blower means for drawing the aerosol through an inlet, moving the aerosol along a path, and then exhausting the aerosol through an outlet, b) a filter medium of claim 1 stored in a replaceable supply roll and extending across said path to a take-up roll, and c) drive means for advancing the filter medium at a predetermined rate from the supply roll to the take-up roll.

7. A respirator adapted to be worn by a person, in which a filter medium of claim 1 is disposed across the path of air intake into the respirator.

8. A filter medium of claim 1 in which the microfibers comprise a polymer based on vinyl chloride.

9. A room air cleaner comprising a) blower means for drawing air through an inlet, moving the air along an air path, and then exhausting the air through an outlet, and b) a filter medium of claim 1 disposed across the air path.

10. A room air cleaner of claim 6 in which the filter medium is stored in a supply roll and extends across the air path to a take-up roll, and the room air cleaner includes drive means for advancing the filter medium at a predetermined rate from the supply roll to the take-up roll.

11. A filter medium of claim 1 in which the layer of microfibers comprises solution-blown microfibers.

12. A filter medium of claim 9 in which the layer of microfibers includes rounded nonfibrous particles of the polymer from which the solution-blown microfibers are made.

13. A filter medium of claim 11 in which the microfibers have an average diameter less than about 0.3 micrometer.

14. A multilayer filter medium exhibiting a low pressure drop at a desired particle penetration comprising a preformed handleable self-supporting porous fibrous base layer; at least one thin lightweight filtration layer of solution-blown polymeric randomly arranged microfibers having an average diameter less than about 0.5 micrometer deposited on said base layer, said layer of microfibers weighing less than 0.01 pound per square yard; and a porous top layer laminated over the layer of microfibers so as to unify the filter medium into a single handleable self-supporting sheet material; said base and top layers contributing less than 20 percent of the pressure drop through the filter medium when tested at a face velocity of 100 feet per minute.

15. A filter medium of claim 14 in which the layer of solution-blown microfibers includes rounded nonfibrous particles of the polymer from which the solution-blown microfibers are made.

16. A filter medium of claim 14 in which the microfibers have an average diameter of less than 0.3 micrometer.

17. A filter medium of claim 14 in which said layer of microfibers has a relationship of initial particle penetration to pressure drop when tested at a face velocity of 100 feet per mintue within the range defined by the curves C and D shown in FIG. 3.

18. A respirator adapted to be worn by a person in which a filter medium of claim 14 is disposed across the path of air intake into the respirator.

19. A filter medium of claim 14 in which said layer of microfibers weighs less than about 0.005 pound per square yard.

20. A multilayer filter medium exhibiting a low pressure drop at a desired particle penetration comprising a preformed porous nonwoven fibrous base layer; at least one thin lightweight filtration layer of solution-blown polymeric randomly arranged microfibers having an average diameter less than about 0.5 micrometer deposited on said base layer, said layer of microfibers weighing less than 0.01 pound per square yard and having insufficient integrity to be removed form the base layer and wound and unwound by itself from a storage roll, but contributing at least 80 percent of the pressure drop through the filter medium when measured at a face velocity of 100 feet per minute; and a porous top layer laminated over the layer of microfibers so as to unify the filter medium into a single handleable self-supporting sheet material.

21. A filter medium of claim 20 in which said layer of microfibers has a relationship of initial particle penetration to pressure drop when tested at a face velocity of 100 feet per minute within the range defined by curves C and D shown in FIG. 3.

* * * * *

UNITED STATES PATENT AND TRADEMARK OFFICE
CERTIFICATE OF CORRECTION

PATENT NO. : 4,011,067
DATED : March 8, 1977
INVENTOR(S) : Patrick H. Carey, Jr.

It is certified that error appears in the above-identified patent and that said Letters Patent are hereby corrected as shown below:

In column 1, line 18, "partiles" should be --particles--.

In column 2, line 15, "bieng" should be --being--.

In column 4, line 44, "polution" should be --solution--.

In column 5, line 28, "filters" should be --fibers--.

In column 5, line 36, insert --porous-- after "base".

In column 7, Table I, Ex. No. 6, under Polymer heading, "0.63" should be --0.53--.

In column 8, Table I, last four column headings,

| "Air Pressure in Air Collector Plenum (psi)" | should be | --Air Pressure in Air Plenum (psi)-- |
|---|---|---|
| "Pressure Speed (ft./min.)" | should be | --Collector Speed (ft./min.)" |
| "Particle Drop (in. of water)" | should be | --Pressure Drop$^1$ (in. of water)-- |

UNITED STATES PATENT AND TRADEMARK OFFICE
CERTIFICATE OF CORRECTION

PATENT NO. : 4,011,067

DATED : March 8, 1977

INVENTOR(S) : Patrick H. Carey, Jr.

It is certified that error appears in the above-identified patent and that said Letters Patent are hereby corrected as shown below:

"Initial Penetration$^1$ (percent)" should be --Initial Particle Penetration$^1$ (percent)--

In column 9, line 20, insert --a-- after "c)".

In column 9, line 33, "6" should be --9--.

In column 9, line 41, "9" should be --11--.

In column 10, line 38, "form" should be --from--.

Signed and Sealed this

Twenty-eighth Day of June 1977

[SEAL]

Attest:

RUTH C. MASON
*Attesting Officer*

C. MARSHALL DANN
*Commissioner of Patents and Trademarks*